United States Patent
Rouquette

(10) Patent No.: US 7,616,522 B2
(45) Date of Patent: Nov. 10, 2009

(54) SEISMIC STREAMER WITH IRREGULARLY SPACED HYDROPHONES

(75) Inventor: Robert E. Rouquette, Kenner, LA (US)

(73) Assignee: Input/Output, Inc., Stafford, TX (US)

(*) Notice: Subject to any disclaimer, the term of this patent is extended or adjusted under 35 U.S.C. 154(b) by 38 days.

(21) Appl. No.: 11/750,803

(22) Filed: May 18, 2007

(65) Prior Publication Data

US 2008/0285380 A1    Nov. 20, 2008

(51) Int. Cl.
*G01V 1/38* (2006.01)
(52) U.S. Cl. .......................... 367/20; 367/154
(58) Field of Classification Search ............ 367/20, 367/154
See application file for complete search history.

(56) References Cited

U.S. PATENT DOCUMENTS

| | | | |
|---|---|---|---|
| 3,877,033 A * | 4/1975 | Unz | ............ 367/154 |
| 4,011,539 A | 3/1977 | Rogers | |
| 4,737,937 A | 4/1988 | Keckler et al. | |
| 4,958,331 A | 9/1990 | Wardle | |
| 5,579,286 A | 11/1996 | Skorheim | |
| 5,774,690 A | 6/1998 | O'Neill | |
| 6,580,661 B1 | 6/2003 | Marschall et al. | |
| 6,684,160 B1 * | 1/2004 | Ozbek et al. | ............ 367/20 |

OTHER PUBLICATIONS

Input/Output, Inc., MSX Active Streamer Section (product data sheet), Copr. 1999, pp. 1-4, Input/Output, Inc., Stafford, TS, U.S.A.
International Search Report and Written Opinion of the International Searching Authority for PCT/US08/63146, European Patent Office, mailed Sep. 10, 2009.

* cited by examiner

*Primary Examiner*—Ian J Lobo
(74) *Attorney, Agent, or Firm*—James T. Cronvich

(57) ABSTRACT

A seismic streamer and a method for positioning a group of hydrophones in a seismic streamer. The hydrophones in a group are spaced irregularly along the length of the streamer to reduce the influence of bulge-wave noise and flow noise on the hydrophone group response. The irregular spacing may be produced as pseudorandom deviations of the actual positions of the hydrophones from a nominal uniform spacing of hydrophones.

15 Claims, 2 Drawing Sheets

#

SEISMIC STREAMER WITH IRREGULARLY SPACED HYDROPHONES

BACKGROUND

The invention relates generally to offshore seismic prospecting and, more particularly, to seismic streamers housing groups of hydrophones.

In prospecting for oil and gas deposits beneath the sea floor, survey vessels tow hydrophone cables, or seismic streamers, and seismic sources through the water. Seismic waves emitted periodically by the seismic sources reflect off geologic structures beneath the sea floor. The reflected seismic waves cause pressure changes that are detected by the hydrophones in the streamer. The hydrophones are conventionally divided into groups along the length of the streamer. The outputs of the hydrophones in each group are usually connected electrically in parallel to produce a group response with a higher signal-to-noise ratio than for any single hydrophone response. But some noise sources are not integrated out as well in the group response. Bulge-wave noise in a liquid-filled streamer is caused by the sloshing back and forth of the liquid along the streamer as it is being towed. Flow noise is caused by the shedding of vortices in the turbulent boundary layer surrounding both liquid-filled and solid, or gel-filled, streamers as they are towed through the water. Both bulge-wave noise and flow noise are characterized by oscillatory or periodic pressure variations propagating along the length of the streamer. These pressure fluctuations correlate in time as well as in distance along the streamer. Because the hydrophones in each group are conventionally spaced uniformly along the length of the streamer, the pressure fluctuations are aliased into the group response and lower the signal-to-noise ratio.

For example, the noise gain of a group of eight hydrophones uniformly spaced on 1.6 m intervals is given by the solid plot in FIG. 1. The peaks in the noise gain in the low frequency-region, which includes the bulge-wave and flow noise bands, indicate a relatively high noise correlation for the uniformly spaced hydrophone group.

As another example, the noise gain of a group of fourteen hydrophones 10 arranged along a streamer as shown in FIG. 2, is given in FIG. 3. The hydrophone spacings are mirror images of each other about the group center, with the spacing of the innermost hydrophones $\Delta=0.875$ m and the outermost hydrophones $2\Delta=1.75$ m. The noise gain is that of a hydrophone group in a conventional MSX™ Active Streamer Section manufactured and sold by Input/Output, Inc. of Stafford, Tex., U.S.A. Although the hydrophones are not uniformly spaced, their positions along the streamer follow a discernible regular pattern as seen in FIG. 2. Because of the hydrophone pattern, the bulge-wave and flow noise gain characteristic of FIG. 3 exhibits undesirable peakiness indicating unwanted noise correlation at the lower frequencies.

SUMMARY

These shortcomings of conventional streamers having groups of uniformly or regularly spaced hydrophones are overcome by a seismic streamer embodying features of the invention. In one aspect, a streamer comprises a group of hydrophones whose outputs are combined to produce a group response. The hydrophones are disposed at predetermined irregular positions along the length of the streamer.

In another aspect, a seismic steamer comprises a group of N hydrophones. The hydrophones are disposed sequentially along the length of the streamer at predetermined irregular positions $\{h_1, h_2, \ldots, h_N\}$ that deviate from a set of uniform positions $\{P_1, P_1+D, P_1+2D, \ldots, P_1+(N-1)D\}$ equally spaced apart a distance D by a unique directed distance $\{d_1, d_2, \ldots, d_N\}$ at each hydrophone position.

In yet another aspect, a seismic streamer comprises a group of N hydrophones having outputs combined to produce a group response. The hydrophones are disposed sequentially along the length of the streamer at predetermined irregular positions $\{h_1, h_2, \ldots, h_N\}$ determined by a pseudorandom sequence of numbers $\{a_1, a_2, \ldots, a_N\}$.

Still another aspect of the invention provides a method for positioning a group of hydrophones. The method comprises: (a) assigning each of a statistically random sequence of numbers to a corresponding hydrophone in a group of hydrophones; and (b) positioning the hydrophones in a seismic streamer at hydrophone positions longitudinally offset from a series of equally spaced positions along the length of the streamer by an amount at each hydrophone position proportional to the corresponding assigned number.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 4:
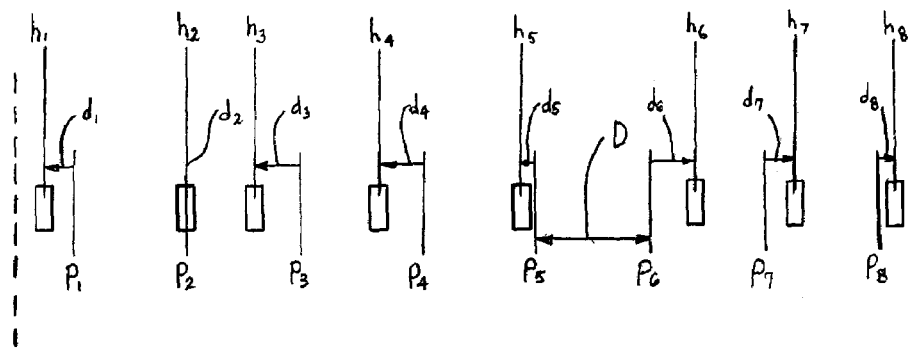
FIG. 4 is a diagram of an arrangement of eight irregularly spaced hydrophones along a streamer embodying features of the invention.

FIG. 4 depicts an arrangement of eight hydrophones $H_1$-$H_8$ in an active section of a seismic streamer 12 being towed in a tow direction 14. The outputs 16 of the group of hydrophones are combined to produce a group response signal 18. The hydrophones are arranged sequentially along the length of the streamer in spaced apart positions $h_1$-$h_8$ corresponding to each of the hydrophones. As shown scaled down in FIG. 4, the positions $h_1$-$h_8$ define an irregular spacing of the hydrophones that shows no discernible pattern.

The irregular hydrophone spacing in FIG. 4 is determined by a statistically random sequence of numbers—more specifically, a predetermined pseudorandom sequence of numbers $\{a_1, a_2, \ldots, a_8\} = \{-2, 0, -4, -3, -1, 3, 2, 1\}$. Each number of the sequence $\{a_1, a_2, \ldots, a_8\}$ is assigned to one of the hydrophones $\{H_1, H_2, \ldots, H_8\}$. The numbers in the sequence are proportional to directed distances $\{d_1, d_2, \ldots, d_8\}$ from a set of nominal uniform positions $\{P_1, P_2, \ldots, P_8\}$ separated by a distance D. ($\{P_1, P_2, \ldots, P_8\} = \{P_1, P_1+D, \ldots, P_1+7D\}$.) The directed distance is defined as the deviation (magnitude and direction) of each hydrophone from the corresponding uniform position.

In a preferred version, the directed distances are related to the pseudorandom sequence by $d_i = a_i(D/8)$, where each $a_i$ is a unique element of the set $\{-4, -3, -2, -1, 0, 1, 2, 3\}$. In this way, no hydrophone position can deviate from its corresponding nominal uniform position by more than $-D/2$ or $+3D/8$, and the spacing between consecutive hydrophones can range from D/8 to 15D/8. More generally, for N hydrophones, the deviations range from $-D/2$ to $(D/2-D/N)$, and the spacing can range from D/N to $(2-1/N)D$.

Figure 1:
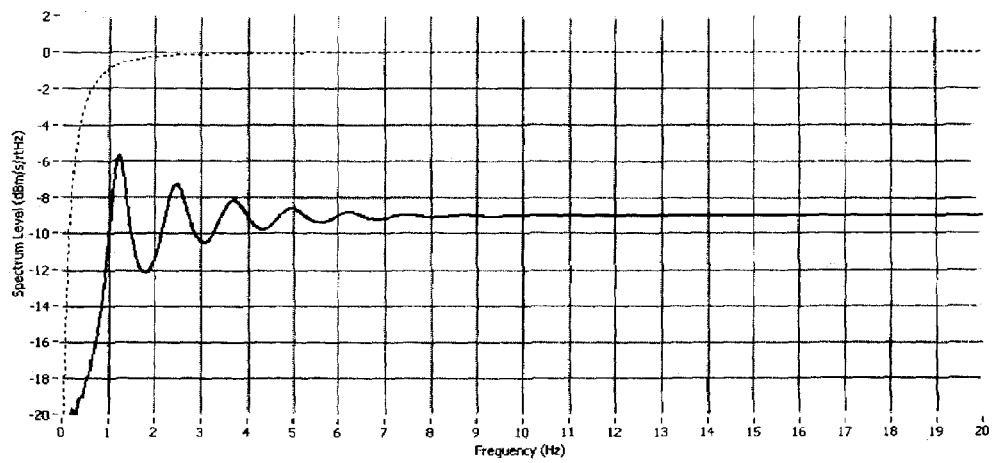
FIG. 1 is a plot of the noise gain of a conventional group of eight uniformly spaced hydrophones.
Figure 2:
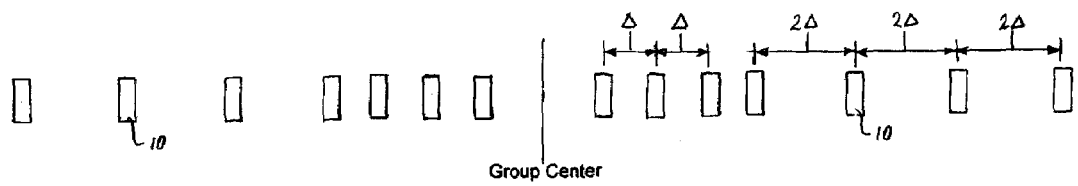
FIG. 2 is a diagram of the arrangement of 14 hydrophones in a prior-art MSX Active Streamer Section.
Figure 3:
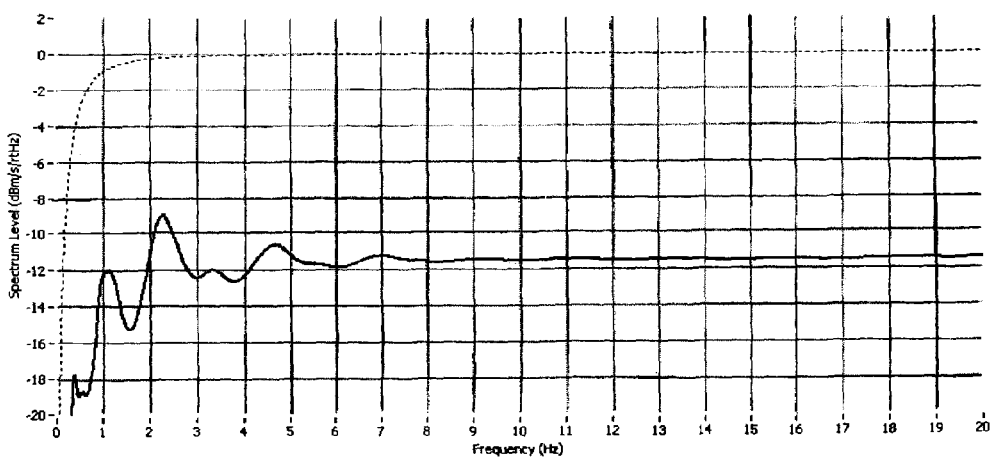
FIG. 3 is a plot of the noise gain of the MSX Section of FIG. 2.
Figure 5:
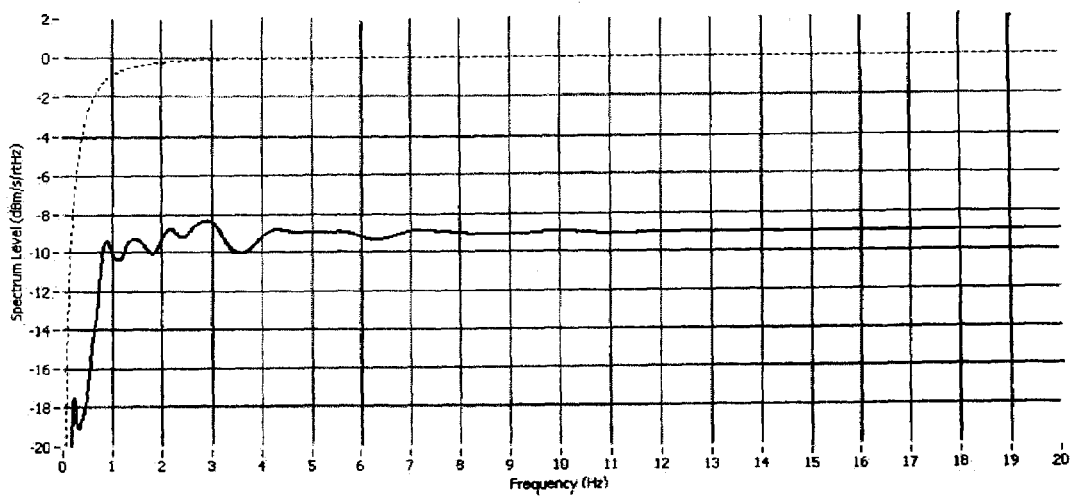
FIG. 5 is a plot of the noise gain of the hydrophone arrangement of FIG. 4.

For the pseudorandom sequence $\{a_1, a_2, \ldots, a_8\}=\{-2, 0, -4, -3, -1, 3, 2, 1\}$ and D=1.44 m, $\{d_1, d_2, \ldots, d_8\}=\{-0.36$ m, 0 m, $-0.72$ m, $-0.54$ m, $-0.18$ m, $0.54$ m, $0.36$ m, $0.18$ m$\}$. If the first uniformly spaced hydrophone position $P_1$ is taken as the reference ($P_1$=0), the actual positions of the hydrophones $H_1$-$H_8$ relative to $P_1$ is given by $\{h_1, h_2, \ldots, h_8\}=\{-0.36$ m, $1.44$ m, $2.16$ m, $3.78$ m, $5.58$ m, $7.74$ m, $9.00$ m, $10.26$ m$\}$. The noise gain of the group of eight hydrophones irregularly spaced as given by this example is shown in FIG. 5. Peaks in the noise gain characteristic are attenuated much more than for the noise gain of uniformly spaced or pattern-spaced hydrophone groups as in FIGS. 1 and 3. The flatter low-frequency region means that flow and bulge-wave noise are much less correlated in a group of irregularly spaced hydrophones.

In general, a group of N hydrophones $H_1$-$H_N$ will be disposed at predetermined irregular positions $\{h_1, h_2, \ldots, h_N\}$ offset longitudinally from a set of uniform positions $\{P_1, P_1+D, P_1+2D, \ldots, P_1+(N-1)D\}$ equally spaced apart a distance D by a unique directed distance $\{d_1, d_2, \ldots, d_N\}$ at each hydrophone position. The directed distances $\{d_1, d_2, \ldots, d_N\}$ assigned to the hydrophones are proportional to a sequence of statistically random numbers $\{a_1, a_2, \ldots, a_N\}$ that is determined to give a preferred noise gain for the hydrophone group. It is also possible to use a reversal of the predetermined irregular sequence together with the original sequence to achieve similar results. For example, for a group of sixteen hydrophones, eight of the phones could be positioned as in FIG. 4 and another eight arranged as a mirror-image of the first eight reflected about a cable position 20 spaced a distance D/2, for example, from the first nominal uniform position $P_1$. In such a case, the resulting sequence $\{a_1, a_2, \ldots, a_{N/2-1}, \ldots, a_{N-1}, a_N\}=\{a_1, a_2, \ldots, a_{N/2}, a_{N/2}, \ldots, a_2, a_1\}$.

Although the invention has been described in detail with respect to a few preferred versions, other versions are possible. For example, a pseudorandom number generator is only one way to generate a sequence of statistically random numbers. Sequences of numbers generated in other ways can produce statistically random hydrophone positions that are irregular and follow no discernible patterns. All the numbers in the sequence do not have to be unique or uniformly distributed. As another example, the outputs of the hydrophones may be equally weighted or weighted non-uniformly when combined. And the outputs may be combined by electrical connection in parallel to produce a group response within the streamer or individually converted to digital signals and combined in a signal processor located in the streamer or on board the survey vessel. So, as these few examples suggest, the scope and spirit of the claims are not meant to be limited to the preferred versions.

What is claimed is:

1. A seismic streamer comprising:
   a first group of hydrophones having outputs combined to produce a first group response;
   wherein the hydrophones in the first group are disposed at predetermined irregular positions along the length of the seismic streamer;
   wherein the predetermined irregular positions are specified by a statistically random sequence of numbers, each number defining the deviation of the position of an associated one of the hydrophones from a corresponding nominal position in a uniform spacing of hydrophones.

2. A seismic streamer as in claim 1 further comprising:
   a second group of hydrophones having outputs combined to produce a second group response and disposed aft of the first group of hydrophones along the seismic streamer;
   wherein the hydrophones in the second group are disposed at predetermined second positions that are mirror images of the predetermined irregular positions of the first group of hydrophones about a point on the seismic streamer between the first group and the second group.

3. A seismic streamer as in claim 2 wherein the first group response and the second group response are combined.

4. A seismic streamer comprising:
   a first group of hydrophones having outputs combined to produce a first group response;
   wherein the hydrophones in the first group are disposed at predetermined irregular positions along the length of the seismic streamer;
   wherein the predetermined irregular positions are specified by a statistically random sequence of numbers that is a pseudorandom sequence of numbers.

5. A seismic streamer as in claim 4 wherein the first group of hydrophones includes eight hydrophones positioned along the length of the seismic streamer sequentially from a first hydrophone to an eighth hydrophone and wherein the corresponding pseudorandom sequence is $\{2, 0, -4, -3, -1, 3, 2, 1\}$ from the first hydrophone to the eighth hydrophone.

6. A seismic streamer as in claim 4 further comprising:
   a second group of hydrophones having outputs combined to produce a second group response and disposed aft of the first group of hydrophones along the seismic streamer;
   wherein the hydrophones in the second group are disposed at predetermined second positions that are mirror images of the predetermined irregular positions of the first group of hydrophones about a point on the seismic streamer between the first group and the second group.

7. A seismic streamer as in claim 6 wherein the first group response and the second group response are combined.

8. A seismic streamer comprising:
   a group of N hydrophones;
   wherein the hydrophones in the group are disposed sequentially along the length of the seismic streamer at predetermined irregular positions $\{h_1, h_2, \ldots, h_N\}$ that deviate from a set of uniform positions $\{P_1, P_1+D, P_1 2D, \ldots, P_1+(N-1)D\}$ equally spaced apart a distance D by a unique directed distance $\{d_1, d_2, \ldots, d_N\}$ at each hydrophone position;
   wherein the spacing between the positions of consecutive hydrophones ranges from D/N to $(2-1/N)D$.

9. A seismic streamer as in claim 8 wherein each d selected from $\{d_1, d_2, \ldots, d_N\}$ is a unique integral multiple of D/N ranging from $-D/2$ to $(D/2-D/N)$.

10. A seismic streamer as in claim 8 wherein N=8 and $\{d_1, d_2, \ldots, d_8\}$ is proportional to $\{-2, 0, -4, -3, -1, 3, 2, 1\}$.

11. A seismic streamer comprising:
    a group of N hydrophones having outputs combined to produce a group response;
    wherein the hydrophones in the group are disposed sequentially along the length of the seismic streamer at predetermined irregular positions $\{h_1, h_2, \ldots, h_N\}$ determined by a pseudorandom sequence of numbers $\{a_1, a_2, \ldots, a_N\}$ and, wherein each pseudorandom sequence of numbers is proportional to the deviation of the position of a corresponding one of the group of N hydrophones from a corresponding one of a set of equally spaced positions along the length of the seismic streamer.

12. A seismic streamer as in claim 11 wherein no two elements of the pseudorandom sequence are equal.

13. A seismic streamer as in claim 11 wherein $a_1 = a_N$, $a_2 = a_{N-1}$, $a_3 = a_{N-2}$, ..., $a_{N/2} = a_{N/2+1}$.

14. A seismic streamer as in claim 11 wherein N=8 and $\{a_1, a_2, \ldots, a_N\}$ is given by $\{-2, 0, -4, -3, -1, 3, 2, 1\}$.

15. A method for positioning a group of hydrophones in a seismic streamer, the method comprising:

defining a series of uniformly spaced positions along the length of a seismic streamer, each of the positions associated with one of the hydrophones of a group of hydrophones to be positioned along the streamer;

assigning each of a statistically random sequence of numbers to a corresponding one of the hydrophones of the group of hydrophones;

positioning the hydrophones in the seismic streamer at hydrophone positions longitudinally offset from a series of equally spaced positions along the length of the seismic streamer by an amount at each hydrophone position proportional to the corresponding assigned numbers.

* * * * *